United States Patent [19]

Rosán, Jr.

[11] 4,179,038

[45] Dec. 18, 1979

[54] SELF-SEALING FLANGE AND METHOD OF INSTALLATION THEREOF

[75] Inventor: José Rosán, Jr., Newport Beach, Calif.

[73] Assignee: Rosan Engineering Corp., Newport Beach, Calif.

[21] Appl. No.: 774,880

[22] Filed: Mar. 7, 1977

[51] Int. Cl.² .............................................. F16L 3/12
[52] U.S. Cl. .................................... 220/243; 220/288; 138/94.3; 285/161
[58] Field of Search ............... 285/161, 158, 208, 209, 285/192; 277/11; 220/243–251, 288; 138/94.3, 92

[56] References Cited

U.S. PATENT DOCUMENTS

| | | | |
|---|---|---|---|
| 1,248,311 | 11/1917 | Gibson | 220/243 |
| 2,705,574 | 4/1955 | Schoessow et al. | 220/243 |
| 3,335,896 | 8/1967 | Santarelli | 220/243 |
| 3,401,958 | 9/1968 | Demyon | 285/208 |

FOREIGN PATENT DOCUMENTS

| | | | |
|---|---|---|---|
| 558892 | 6/1923 | France | 220/243 |
| 22828 | 10/1903 | United Kingdom | 285/208 |

*Primary Examiner*—Robert I. Smith

[57] ABSTRACT

A self-sealing flange assembly includes an elliptical shaped hole in a blind wall, the greatest diameter of which is larger than the smallest diameter of an elliptical shaped inner flange. Attached at a right angle to the surface of the flange is an internally or externally threaded nipple, bushing, stud or fastener. An annular groove located on the circumference of the flange contains a sealing means. At least one dimple at an apex of the elliptical flange locates the flange in situ when it is inserted through the wall opening and positioned thereon. An outer elliptical washer type element is tightened against the outer wall by rotation of a nut on the threads of the nipple, bushing, stud or rotating the bolt in the fastener, compressing the elliptical inner flange and sealing means against the inner wall forming a one piece leak proof assembly. The dimple used to locate the flange in situ also prevents rotation of the inner flange during the tightening process. A method of drilling a generally elliptical hole in blind walls to accommodate the claimed elliptical flange in which two holes are drilled with a drill bit with a diameter equal to twice the sum of the minimum diameter of the flange plus 1/6 the minimum divided by two and one hole is drilled with a drill bit with a diameter of the smaller drill bit plus a distance equal to one-third the minimum diameter of the flange. Both drill bits are centered on a single line. The larger hole is drilled at the center of that line and a smaller hole is drilled on each side proportionately located to achieve a general elliptical shape.

4 Claims, 6 Drawing Figures

SELF-SEALING FLANGE AND METHOD OF INSTALLATION THEREOF

FIELD OF THE INVENTION

This invention relates to closures for blind wall installation. It particularly relates to such closures which are leak proof and in addition to providing a seal to repair or close an opening, can form a workpiece to which instruments, tubing or attachment means can be connected.

DESCRIPTION OF THE PRIOR ART

The prior art discloses devices which are designed to be installed in blind walls or closed recepticles. Some of these devices utilize movable arms or toggle like inner parts which after insertion through a hole in the wall are somehow engaged with the inner surface and cooperate with external fasteners to secure the assembly to the wall. Such a device is disclosed by Byrin U.S. Pat. No. 2,360,395. Others like Demyon U.S. Pat. No. 3,401,958 and Kern U.S. Pat. No. 3,244,056 use inner flanges which are shaped so as to be inserted in a circular opening. After insertion they are rotated so that portions of the flange overlap the opening. When tightened against a blind wall by the cooperative action of an outer flange and a trapped sealing means a secure assembly is achieved. Brandt in U.S. Pat. No. 3,193,662 utilizes an elliptical opening in a tank wall and an elliptical inner flange as does the present invention. But he fails to disclose or claim any advantages of this particular form other than that of finding an elliptical or non-circular shape advantageous to prevent rotation of the assembly during the installation process. His device does not appear to be suited to blind wall installation.

OBJECT OF THE INVENTION

None of these devices provide a simple, easily installed means to seal a leak in a blind wall or to install a device or connection on a blind wall of a tank or other recepticle. I have found that by utilizing the unique shape of an ellipse in combination with a locating and interference dimple and an annular groove containing sealing means, this object can be accomplished. The hole in the blind wall can be elliptical or merely possess certain distinguishing characteristics of an ellipse, i.e. proportionate maximum and minimum diameters. This will enable the opening in the blind wall to be simply formed using two circular drills or cutting tools. Means are provided to hold the flange in sealing engagement with the blind walls by rotating a nut on the external threaded portion of a nipple, stud or bushing which projects outwardly from the surface of the flange.

As an example for illustrative purposes only, a preferred embodiment of the invention is illustrated in the attached drawings.

DESCRIPTION OF THE PREFERRED EMBODIMENT

Figure 1:
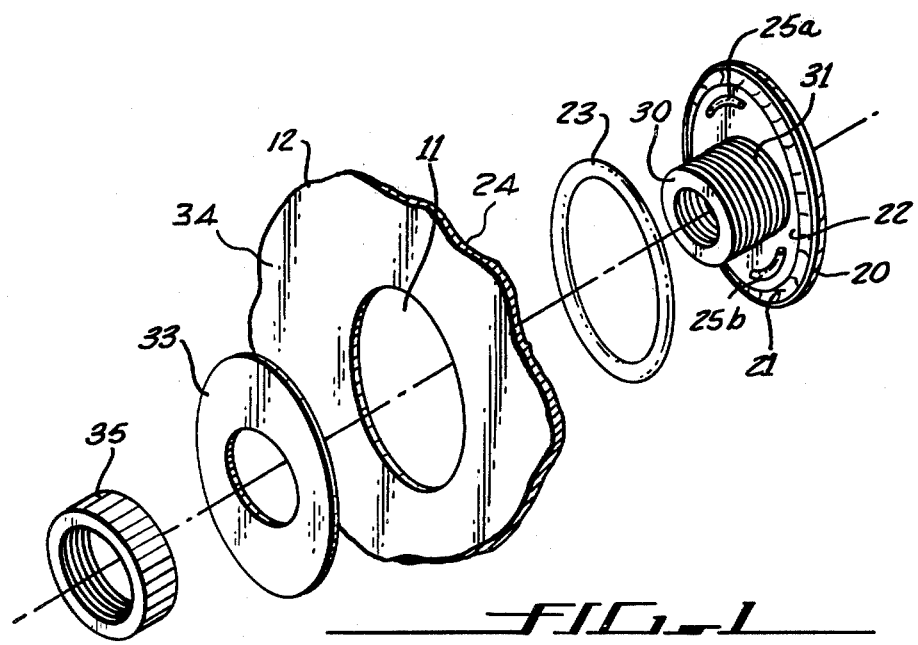
FIG. 1 is an exploded view of a wall opening, the flange, sealing means and other components of this invention.
Figure 2:
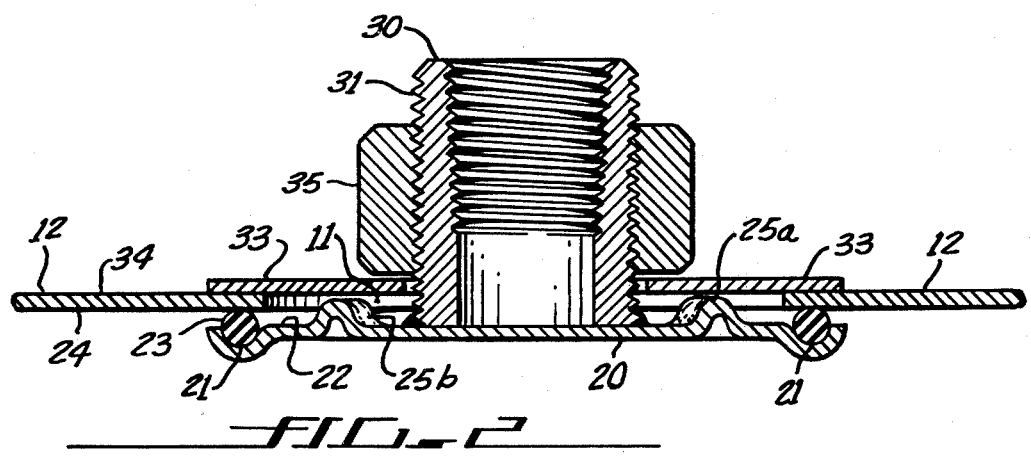
FIG. 2 is a sectional view along 1—1.

In FIGS. 1 and 2 an elliptical opening 11 is cut in the blind wall 12 which is to be repaired or into which a fitting, connection or other device is to be installed. The opening is to be of dimensions such that the largest diameter is greater than the smallest diameter of an elliptical inner flange 20. The elliptical inner flange 20 is formed with an elliptical groove 21 located on the periphery of the flange surface 22. In the elliptical groove 21 sealing means 23 is placed. In this embodiment an elliptical "O" ring 23 is illustrated. However, other sealing means can be used satisfactorily. A bushing 30 with external threads 31 is attached to the flange at a 90° angle to the surface containing the groove, for communication or attachment purposes. A fastener and bolt combination could be used also. Dimples 25a and 25b assist in locating the flange onto the blind wall and prevent rotation when the parts are assembled. Elliptical support flange 33 is fitted over the bushing and seats against the outer wall 34. Attachment means 35, here illustrated by a nut, is rotated tightly on the external threads 31 of bushing 30 drawing the inner flange 20 against the inner wall surface 24. The sealing means 23 in annular groove 21 coacts with inner wall 24 under the assembly pressure to form an air and liquid tight seal.

Support flange 33 by the same pressure is drawn against the outer wall surface 34 covering the elliptical opening and adding to the strength of the final assembly. The flange is installed by first placing sealing means 23 in the elliptical groove 21 on flange 20. The flange 20 is grasped by the bushing or attachment means 30 and inserted through the elliptical opening 11 and pulling the force of flange 20 in semi-sealing position against the inner wall 35 with the dimples 25a and 25b located inside the opening 11. Elliptical support flange 33 is fitted over the bushing or attachment means 20 seated against the outer wall 34. Attachment means 35 is rotated tightly on the threads 31 of bushing 30 drawing all of the parts together in tight sealing engagement with the wall.

Figure 3:
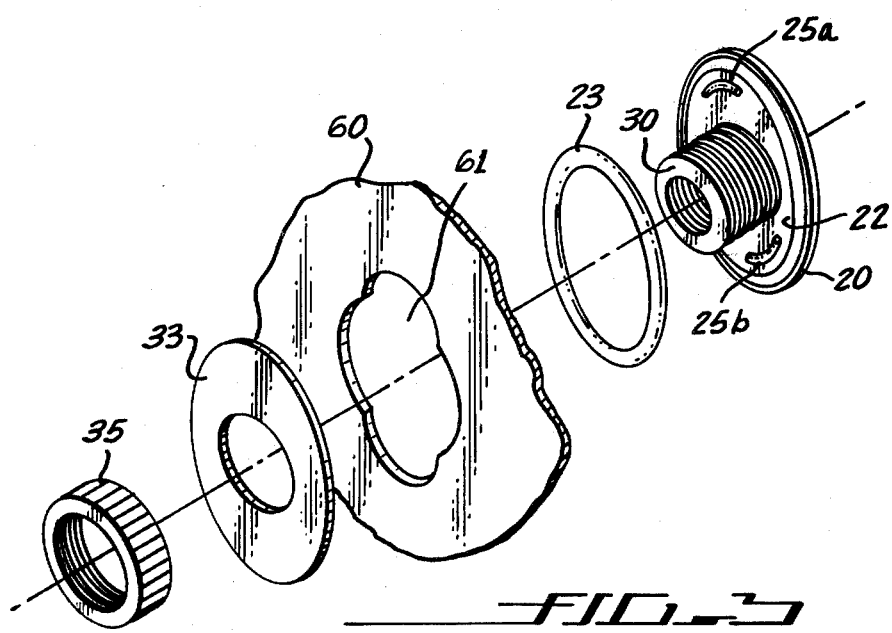
FIG. 3 is an exploded view of another embodiment of the invention showing an easily formed opening in a wall with the important characteristics of an ellipse but not truly elliptical.
Figure 4:
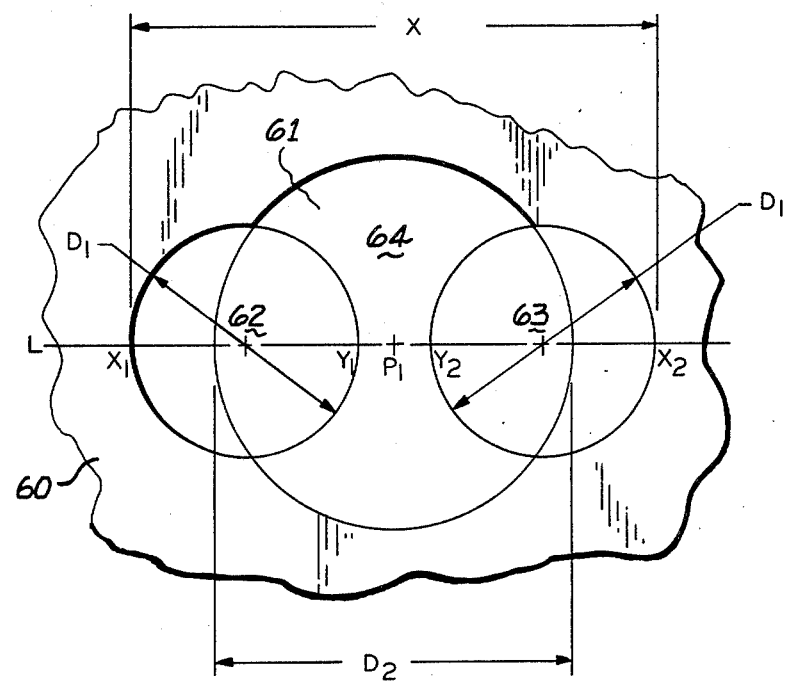
FIG. 4 is a plan view of the wall of FIG. 3 with the opening drilled by the method of this invention.
Figure 5:
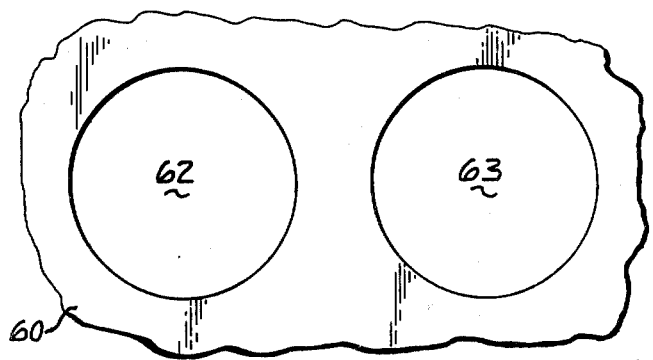
FIG. 5 is a plan view of a step in the claimed method.

FIGS. 3 and 4 illustrate another embodiment of the invention in which the opening 61 in the wall 60 is made by the use of two drills. In this embodiment a point $P_1$ is selected on the wall which will be the midpoint of the completed assembly constructed according to this invention. Draw a line L through $P_1$ greater in length than the largest diameter of a flange selected to meet the requirements of the work situation. Determine distance X the maximum diameter of the wall opening by first measuring the minimum diameter of the selected flange assembly and add to this diameter 1/6 of its measured distance, which will be Y. X will then be the sum of twice the measured minimum diameter plus 1/6 the measured minimum diameter and will be determined by the points $X_1 - X_2$ on L such that $P_1$ is the midpoint of $X_1 - X_2$, i.e. $X = 2 Dmin + 1/6$ Dmin. $Y = 1/6$ Dmin. Next, beginning at point $P_1$ mark off on line L segment $Y_1 - Y_2$ of length Y such that $P_1$ is the midpoint of $Y_1 - Y_2$. Select a drill whose diameter is X/2 identified as $D_1$. Locate a center point on line L which is the midpoint of the line $X_1-Y_1$. Place the center of the drill on this point and drill hole 62. Repeat the operation placing the drill center on line $P_1-X_2$ so that the center of the drill coincides with the midpoint of line $Y_2-X_2$ which line is designated as $D_1$. Drill hole 62. The wall will now resemble FIG. 5.

Figure 6:
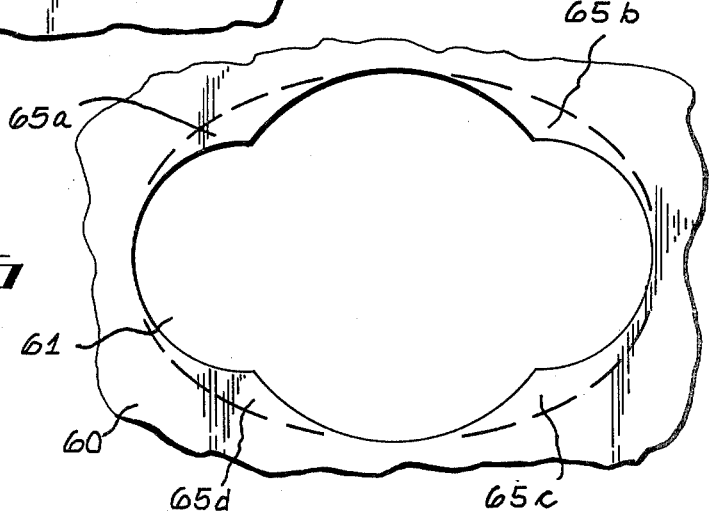
FIG. 6 is a plan view of the completed opening in the wall using the claimed method.

Next select a larger drill whose diameter $D_2$ is represented by the formula $D_2=D_1+2Y$. Place the center of this drill at point $P_1$ and drill hole 64. The wall will now resemble FIG. 6 and is ready for assembly of the flange and other components of the invention.

The metal sections 65a, 65b, 65c, and 65d do not have to be removed since the opening need not be a perfect ellipse.

I claim:

1. A self-sealing flange assembly capable of being removably attached about a generally elliptical opening in a blind wall or similar structure; the self-sealing flange assembly comprising:
   a generally elliptical opening in a workpiece;
   an elliptical flange;
   to which is fastened at a 90° angle thereto threaded attachment means;
   the surface of the flange on which the threaded attachment means is located contains an elliptical groove around the outer periphery thereto;
   at least one outwardly extending dimple means located at each end of the eliptical flange between the annular groove and the attachment means;
   elliptical sealing means located in the elliptical groove;
   elliptical washer means; and
   threaded fastener means to coact with threads of the attachment means to draw the parts in sealing engagement with the inner and outer surfaces of the wall surrounding the elliptical opening.

2. The self-sealing flange assembly of claim 1 in which the threaded attachment means is a nipple or conduit.

3. The self-sealing flange assembly of claim 1 in which the threaded attachment means is a stud.

4. The self-sealing flange assembly of claim 1 in which the threaded attachment means is a fastener to receive a bolt.

* * * * *